(12) United States Patent
Auxerre

(10) Patent No.: US 8,042,878 B2
(45) Date of Patent: Oct. 25, 2011

(54) INTERFACE DISC FOR A VEHICLE WHEEL

(75) Inventor: Pascal Auxerre, Royat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 570 days.

(21) Appl. No.: 11/992,968

(22) PCT Filed: Sep. 18, 2006

(86) PCT No.: PCT/EP2006/066458
§ 371 (c)(1),
(2), (4) Date: Apr. 2, 2008

(87) PCT Pub. No.: WO2007/042374
PCT Pub. Date: Apr. 19, 2007

(65) Prior Publication Data
US 2009/0242093 A1    Oct. 1, 2009

(30) Foreign Application Priority Data

Oct. 7, 2005  (FR) .................................. 05 10309

(51) Int. Cl.
*B60B 7/01* (2006.01)
*B60B 11/10* (2006.01)

(52) U.S. Cl. .................................. 301/37.23; 301/38.1

(58) Field of Classification Search ............... 301/37.22, 301/37.23, 38.1, 39.1, 40.1–40.6
See application file for complete search history.

(56) References Cited

U.S. PATENT DOCUMENTS

| | | | | |
|---|---|---|---|---|
| 3,464,475 A | * | 9/1969 | Freed | 301/38.1 |
| 3,508,790 A | * | 4/1970 | Holmes | 301/39.1 |
| 3,644,001 A | * | 2/1972 | Lavallee | 301/40.6 |
| 5,000,518 A | * | 3/1991 | Markow | 301/40.3 |
| 5,407,255 A | | 4/1995 | Feldman | |
| 5,531,508 A | * | 7/1996 | Bell, III | 301/37.23 |
| 5,551,762 A | * | 9/1996 | Roopngam | 301/40.3 |
| 5,634,993 A | | 6/1997 | Drieux et al. | |
| 5,785,781 A | | 7/1998 | Drieux et al. | |

(Continued)

FOREIGN PATENT DOCUMENTS

| | | | |
|---|---|---|---|
| FR | 2 445 774 | | 8/1980 |
| GB | 2133751 | * | 8/1984 |
| JP | 60 080907 | | 5/1985 |

(Continued)

OTHER PUBLICATIONS

Notification of Reason for Rejection dispatched Jul. 11, 2011 for Japanese Patent Application No. 2008533965 (English language translation).

*Primary Examiner* — Jason Bellinger
(74) *Attorney, Agent, or Firm* — Buchanan, Ingersoll & Rooney PC

(57) ABSTRACT

Interface disc for a vehicle wheel, comprising:
  at least one substantially central attachment element designed to allow the said disc to be attached to a wheel;
  a plurality of substantially radial arms connected to the attachment elements and extending radially outwards from a substantially central portion of the said disc as far as a substantially peripheral portion of the said disc;
  an energy absorption surface collaborating with the said arms and configured to form a wall between the said substantially central portion of the disc and its substantially peripheral portion;
  at least one circumferential reinforcing element collaborating with the said arms and the modulus of which is substantially higher than that of the energy absorption element.

7 Claims, 4 Drawing Sheets

U.S. PATENT DOCUMENTS

| | | | |
|---|---|---|---|
| 6,092,575 A | 7/2000 | Drieux et al. | |
| 6,418,992 B1 | 7/2002 | Drieux et al. | |
| 6,688,703 B1 * | 2/2004 | Wang | 301/37.23 |
| 2002/0121325 A1 | 9/2002 | Albrecht | |

FOREIGN PATENT DOCUMENTS

| | | |
|---|---|---|
| JP | 05 042804 | 2/1993 |
| JP | 6-278425 | 10/1994 |
| JP | 2001-71722 | 3/2001 |

* cited by examiner

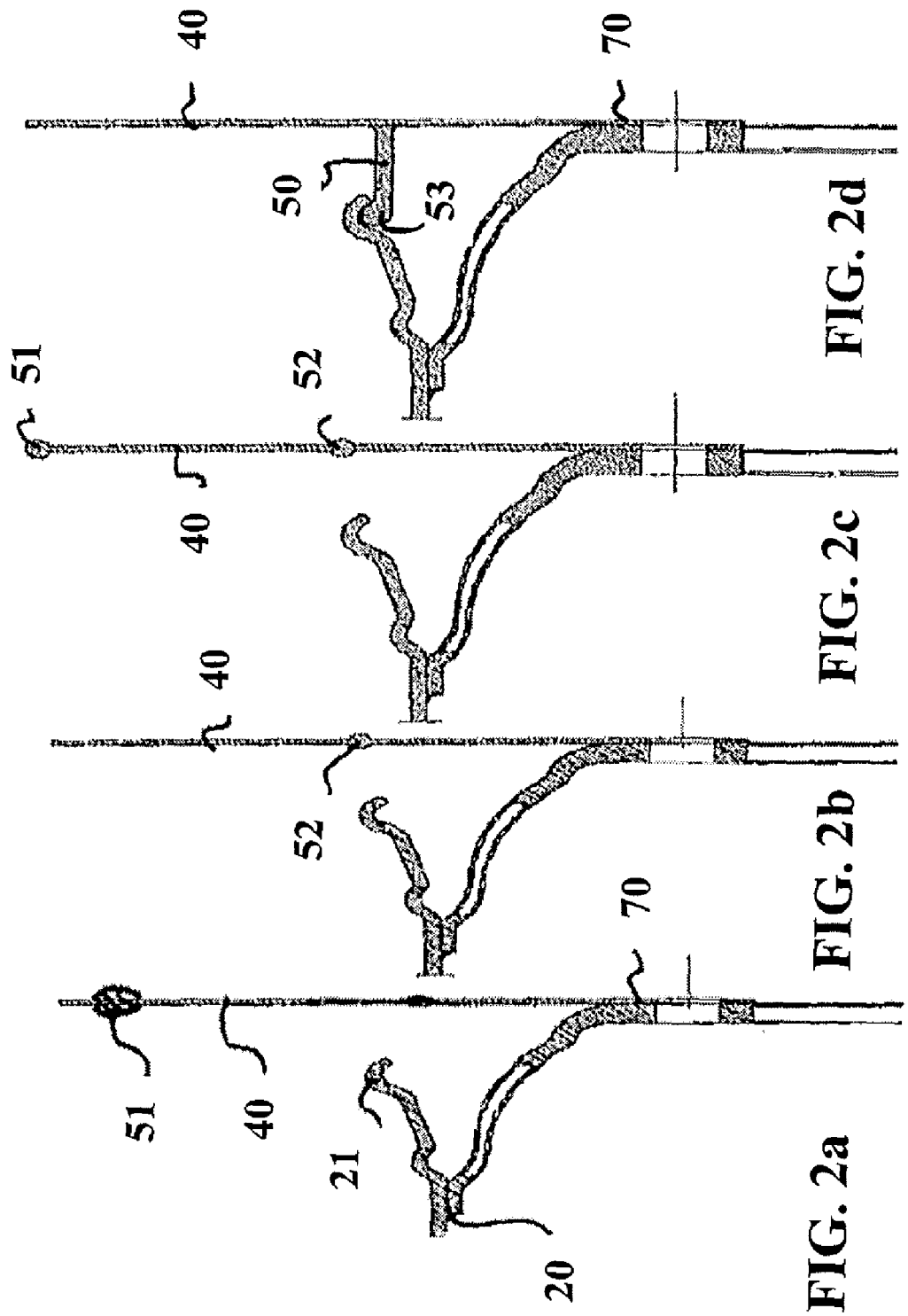

INTERFACE DISC FOR A VEHICLE WHEEL

BACKGROUND

1. Field

The present application relates to tires and in particular to a device to limit the effects caused by a rapid loss of tire pressure.

2. Description of Related Art

Tires of all types are subject to various forms of attack inflicted on them by roads: defects in the road surfacing, the presence of foreign bodies which can sometimes prove to be very aggressive, obstacles of all kinds, etc. This being the case, the risk of a tire becoming punctured during use is present everywhere and under widely varying circumstances. Such punctures may lead to very rapid loss of pressure.

In the case of tires of the passenger vehicle type, this problem has been the subject of numerous technological developments. For example, tire/rim assemblies have been developed (see, in particular, U.S. Pat. No. 6,092,575, U.S. Pat. No. 6,418,992, U.S. Pat. No. 5,634,993 and U.S. Pat. No. 5,785,781) which, in the event of a loss of pressure, allow the user to continue his journey at least over a minimal distance. In general, deflation warning devices are provided in vehicles equipped with such assemblies so as to alert the user to a loss of pressure. Tires in which the structure, particularly in the side walls, is strengthened in order to allow them, even in the deflated state, to carry a load substantially equivalent to their nominal load without any appreciable change in performance, at least over a minimal distance, are also known.

However, not all vehicles, and especially not all vehicles of the heavy goods vehicle type, are currently equipped with such assemblies or tires. In order to make the effects of a puncture on tires of a conventional type as little instantaneous as possible, the prior art has proposed solutions which, for example, involve placing inside each tire of the conventional type another tire of suitable dimensions so that when the tire is punctured or loses pressure, the inner tire serves to support the outer tire. Nonetheless, it remains the case that the difference in behavior between the situation in which the initial tire is inflated and the situation in which the tire is supported by an inner tire is very great (it no longer being the outer tire working but the inner tire) and this may prove to be something that the driver of the vehicle finds difficult to adapt to in such situations.

Devices placed inside the tire and which, while not being inflated during normal use, can reduce the loss of pressure in the tire when the latter is punctured are also known. The document published under reference US2002/0121325 describes a device such as this. The device comprises a toroidal tube the dimensions of which are small by comparison with the volume of the tire cavity in order to avoid as far as possible any interactions between the tire and the tube during normal operation (that is to say when the tire is inflated), this tube being provided with at least one opening to place the cavity delimited by the tube in communication with the cavity of the tire in which the tube is positioned. If the tire is punctured, the inflation pressure in the cavity delimited by the tire and the toroidal tube escapes whereas because the said tube has only a small opening, its pressure remains practically unchanged at least for long enough for the driver to get to a repair facility. The action of the pressure in the tube, the dimensions of which are appropriate to those of the tire in which it is placed, presses it against the beads of the tire with the effect of holding the beads against the rim flanges and limiting the loss of pressure in the tube.

However, while it is easy to have the tube pressed firmly against the beads in a tire with an aspect ratio (cross-sectional height/cross-sectional width) of at least 0.80, the same is not true of a tire of the kind known in English as a "low ratio" tire, that is to say in which the aspect ratio is below 0.80, because the tube, as it inflates, of necessity adopts a purely pneumatic equilibrium shape which tends to distance the said tube from the walls of the tire which it is supposed to push away in order to press them against the rim.

Finally, this tube does not make it possible to prevent the tire behavior from changing because there is a lag of some duration between the start of the loss in pressure from the cavity formed between the tire and the tube and the moment at which the tube is itself called upon to act as a support. Finally, when the tire is supported by the inflated inner tube, the geometry of the tire is quite substantially altered by comparison with the geometry that this same tire adopts when it is inflated and not punctured.

SUMMARY

One object of the present certain embodiments disclosed herein is to reduce the effects of a puncture on tires of a conventional type.

To do this, disclosed herein is an interface disc for a vehicle wheel, comprising:
- at least one attachment element designed to allow the said disc to be attached to a wheel (preferably at the central portion of the said wheel);
- a plurality of substantially radial arms connected to the attachment elements and extending radially outwards from the attachment element;
- an energy absorption surface collaborating with the said arms and intending to close the space defined between the radial arms;
- at least one circumferential reinforcing element of substantially annular shape collaborating with the set of arms and the modulus of which is substantially higher than that of the energy absorption surface.

By virtue of the presence of a device such as this, the consequences of a sudden loss of pressure on the environment immediately surrounding a tire can be lessened. For example, any particles likely to be thrown out during a loss of pressure can be stopped or slowed. The device prevents the air blast caused by the loss of pressure from making its way freely and unchecked into the vicinity of the vehicle. Furthermore, the absorption elements are able to capture a significant proportion of the energy emitted by the said air blast. Thus, by virtue of the means proposed herein, a device is obtained that is positioned on the outside of a tire and which, in the surroundings or vicinity of the said tire, is able to lessen the effects caused by a loss of inflation pressure from a tire that has been punctured, particularly when this loss of pressure occurs very rapidly. The radial arms, which are substantially rigid, hold all the elements quite firmly and afford good structural resistance to forces. The energy absorption surface is flexible and/or more readily deformable than the radial arms: when a significant force is applied, this surface deforms, thus absorbing a significant amount of energy.

According to one advantageous embodiment, the energy absorption surface is a screen. Said screen is preferably substantially solid: for example, it fills, most of the area between the arms.

According to one advantageous embodiment, the interface disc comprises an inner circumferential reinforcing element collaborating with the said arms and positioned in such a way as to lie in the vicinity of the rim flange when the disc has been mounted on a wheel.

According to another advantageous embodiment, the interface disc comprises an outer circumferential reinforcing element collaborating with the said arms and positioned in such a way as to lie in the region radially external to the said disc.

Still according to another advantageous embodiment, the circumferential reinforcing elements have a substantially annular shape and are made of substantially rigid material (for example a metallic material such as steel) so that the circumferential reinforcements are, per se, more rigid than the energy absorption surface and play a part in making the latter more rigid.

The energy absorption surface is preferably made of at least one material capable of withstanding a minimum degree of deformation (such as a degree of at least 1.5% deformation) without being destroyed (for example a metallic material such as steel, a woven fabric such as aramid or alternatively a material based on polyurethane).

According to another advantageous embodiment, the attachment elements are designed to attach the disc at the wheel nuts.

According to an advantageous embodiment, the interface disc also comprises a plurality of energy absorbing elements distributed equidistantly along the circumference (for example tie rods or elastic rods, springs, etc). The energy absorbing elements are advantageously adjustable so that their rigidity can be adjusted.

BRIEF DESCRIPTION OF DRAWINGS

Further features and advantages of the embodiments disclosed herein will become apparent from the description given hereinafter with reference to the attached drawings which, by way of non-limiting examples, show some embodiments of the subject matter disclosed herein in which:

in FIG. 1a, the absorption elements are in the rest position while in FIG. 1b they are in the deployed position;

FIGS. 2a, 2b, 2c and 2d illustrate another category of embodiments of a device disclosed herein mounted on a vehicle wheel;

DETAILED DESCRIPTION OF SPECIFIC EMBODIMENTS

Figure 1A:
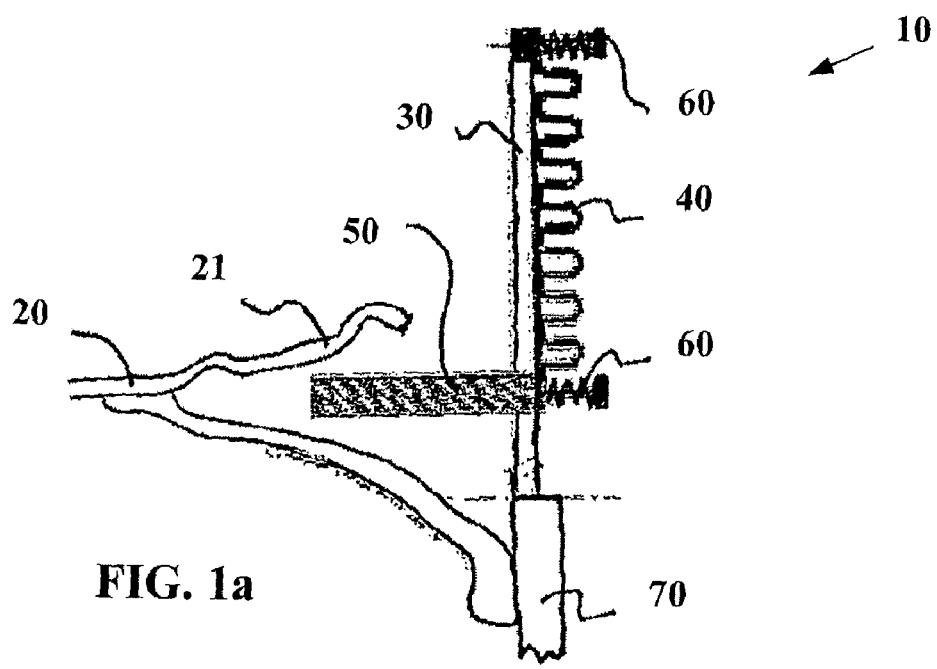
FIGS. 1a and 1b show an embodiment of a device disclosed herein and schematically depict the elements for attachment to a wheel and the absorption elements.
Figure 1B:
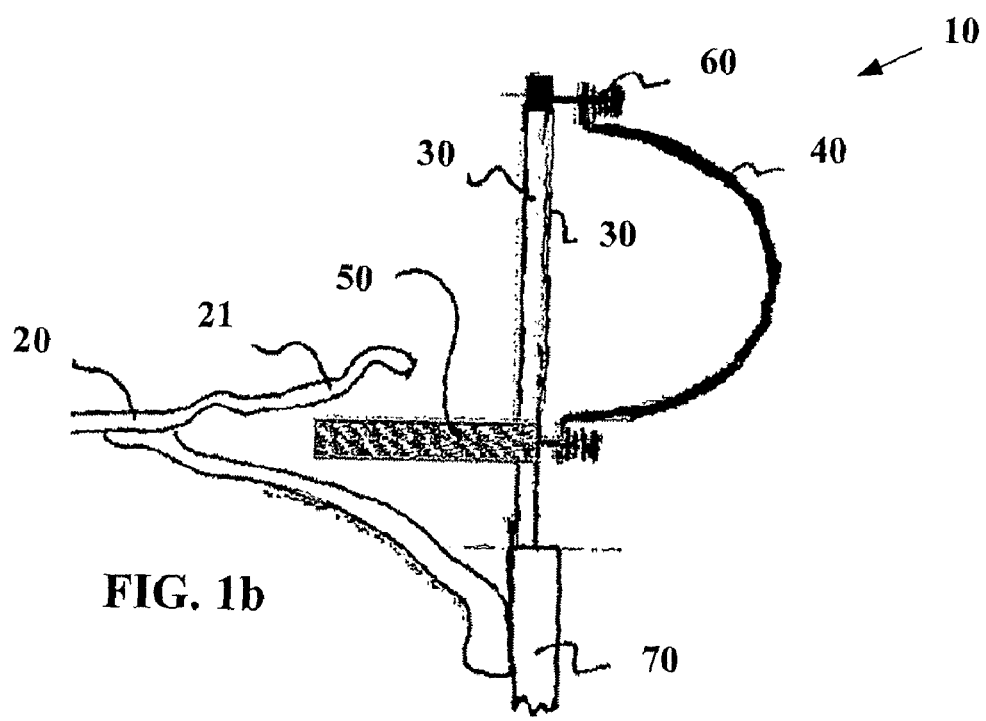

FIGS. 1a and 1b schematically depict an interface disc 10 according to a specific embodiment. At least one, substantially central, attachment element 70 allows the disc to be fitted or attached to a vehicle wheel 20, for example using the wheel nuts. This element may consist of a disc or of any other element of appropriate shape. Radial arms 30 positioned in such a way as to extend radially outward beyond the central elements 70 make it possible, on the one hand, to define a very large area and, on the other hand, to strengthen it locally. They are preferably arranged equal distances apart and form a somewhat rigid basic structure over which a deformable surface is positioned. The arms, for example made of metal, are advantageously profiled in such a way as to optimize rigidity as a function of weight, for example using I-sections or T-sections. The arms are advantageously dimensioned in such a way as to extend beyond the rim flange of the corresponding wheel, for example to end slightly short of the tread of the tire mounted on this wheel so as not to interfere with driving, at least at normal or practically normal pressure.

In order to absorb the energy that could wish to escape between the arms 30, an energy absorption surface 40 is formed of one or more elements positioned in such a way as to cover the space defined between the arms. The surface 40 is advantageously designed to have a substantially annular external contour with a radius chosen to suit that of the arms. For example, according to various alternative forms of embodiment, the radius of this surface is slightly shorter or longer than that of the arms. FIG. 1a shows an interface disc 10 with the surface 40 in the rest position. The surface 40 is then substantially flat and occupies a very small volume. In FIG. 1b, the surface 40 is in the deployed position. This position is obtained, for example, when energy is released, such as in the event of a rapid loss of pressure. The surface 40 is flexible enough that it can deform under the effect of this energy. The deformation absorbs a significant proportion of this energy. The radial arms 30 are designed to be rigid enough that they experience only a minor deformation by comparison with that of the surface 40, as depicted schematically in FIG. 1b where one can clearly see that the arms 30 more or less retain their radial orientation while the surface 40 is completely deformed. This deformation may or may not be elastic, depending on the desired type of system. The number and angular position of the arms 30 can vary with the embodiment. They are advantageously provided such as to afford an interface disc, for which the dynamic balance is as stable as possible.

The disc 10 advantageously comprises one, or preferably several, energy absorbing elements 60 such as tie rods, elastic rods, springs, etc. FIGS. 1a and 1b allow to see the effect of such absorbing elements. Under impulse or under the effect of a release of energy, the absorbers, initially at rest, are stressed and, in addition to the surface 40, absorb another proportion of the emitted energy. In the schematic example illustrated, the absorbent elements 60 are positioned between the radial arms 30 and the surface 40 and are stressed as the latter deploys.

One or more circumferential reinforcing elements 50 may be added to the radial arms in order to increase the rigidity of the whole. In the schematic example illustrated in FIGS. 1a and 1b, use is made of a flat annulus attached to the radial arms 30 and extending axially inwardly towards the rim flange 21. The width or thickness of the element 50 and its orientation substantially perpendicular to the energy absorption surface 40 give it a rigidity which combines with that generated by the arms 30. The elements that contribute to the rigidity 30 and 50 are advantageously designed in such a way that the disc 10 can absorb the maximum amount of energy in the instances that have the highest probability of occurring.

FIGS. 2a to 2d illustrate exemplary embodiments of an interface disc disclosed herein. The central attachment element 70 is designed for attachment using the wheel nuts. The energy absorption surface 40 is provided in direct continuation of the element 70. In the example of FIG. 2a, an outer circumferential reinforcing element 51 is provided in the external region of the surface 40. In that of FIG. 2b, the circumferential reinforcing element 52 is positioned radially towards the inside, close to the rim flange region. In the example of FIG. 2c, two reinforcing elements are provided, one of them, 52, radially towards the inside and the other, 51, radially towards the outside. In these examples, the circumferential reinforcing element adopts the form of an annular bulge extending between the radial arms 30 along the surface 40. This widened portion gives the regions of interface with the surface 40 local rigidity. In the example of FIG. 2d, the element 50 is similar to that of the example of FIGS. 1a and 1b. It also comprises an end fold 53 allowing it to fit into the rim flange. In these various examples, the relative positions, number, shape and other features of the various circumferential reinforcing elements can vary. In the various FIGS. 2a to 2d the view shown is a section chosen to fall at an angular position between the radial arms 30 which are therefore not visible in these figures.

Figure 3A:
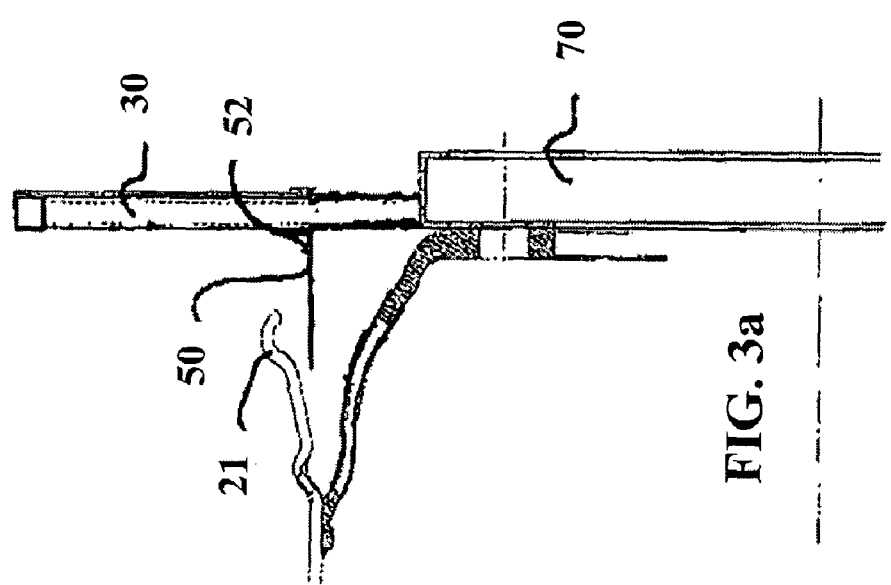
FIGS. 3 and 4 illustrate other exemplary embodiments of such devices.

The section in FIG. 3a is taken at an angular position which shows one of the radial arms 30. These radial arms are provided in the continuation of the attachment element 70. As illustrated, the arms 30 collaborate with an inner circumferential reinforcing element 52.

Figure 3B:
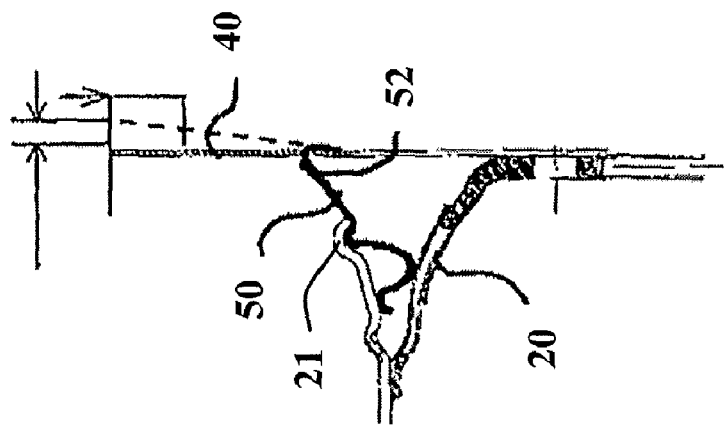

The example of FIG. 3b shows another type of inner circumferential reinforcing element 52 that collaborates both with the rim flange 21 and with the internal portion of the wheel 20.

Figure 3C:
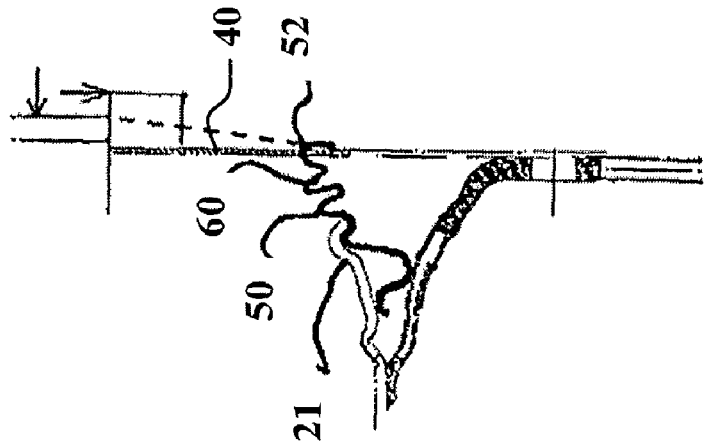

In the embodiment of FIG. 3c, the functions of the circumferential reinforcing element 50 and the energy absorbing element 60 have been combined into a single element 52 attached, on the one hand, radially on the inside of the surface 40 and also collaborating with the rim flange 21.

Figure 4:
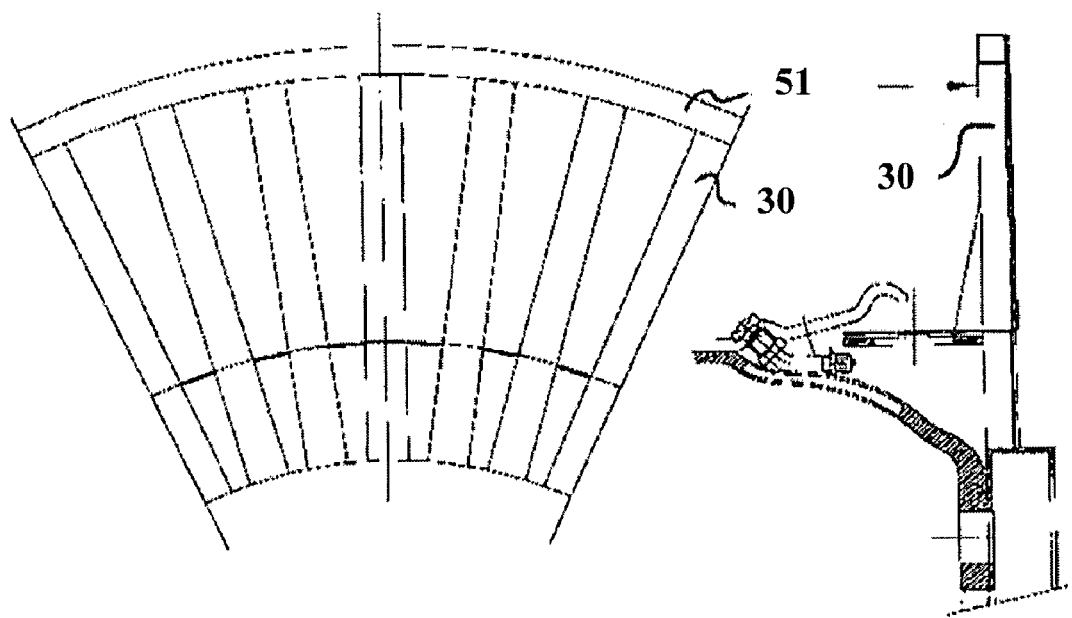

FIG. 4 shows, in addition to a transverse view as in the other figures, a head-on view of a disc showing a portion of the radial arms 30.

The invention having been described herein with respect to certain of its specific embodiments and examples, it will be understood that these do not limit the scope of the appended claims.

The invention claimed is:

1. An interface disc for a vehicle wheel, comprising:
   a. at least one attachment element by which said disc attaches to a vehicle wheel;
   b. a plurality of substantially rigid radial arms connected to the at least one attachment elements and extending radially outwards from the at least one attachment element;
   c. an energy absorption surface collaborating with said substantially rigid radial arms and extending circumferentially in the space defined between the substantially rigid radial arms, wherein the energy absorption surface is a substantially solid screen that is undeformed in a rest position so that the energy absorption surface and the radial arms together form an annular ring in the rest position, and that is flexible and more deformable than the substantially rigid radial arms so that the energy absorption surface deforms from the rest position under the effect of energy released from a rapid loss of pressure from a tire attached to the vehicle wheel and so that this deformation partially or wholly absorbs this energy;
   d. at least one circumferential reinforcing element of substantially annular shape collaborating with the set of arms and the elastic modulus of which is substantially higher than that of the energy absorption surface.

2. The interface disc according to claim 1, comprising an inner circumferential reinforcing element collaborating with said arms and positioned in such a way as to lie in the vicinity of the rim flange when the disc has been mounted on a wheel.

3. The interface disc according to claim 1, comprising an outer circumferential reinforcing element collaborating with said arms and positioned in such a way as to lie in the region radially external to said disc.

4. The interface disc according to claim 1, in which the energy absorption surface is made of at least one material capable of withstanding a minimum degree of deformation without being destroyed.

5. The interface disc according to claim 1, in which the attachment element is suitable for attaching the disc at the wheel nuts.

6. The interface disc according to claim 1, further comprising a plurality of energy absorbing elements distributed equidistantly along the circumference.

7. The interface disc according to claim 6, in which the energy absorbing elements are adjustable so that the rigidity of the energy absorbing elements can be altered.

* * * * *